Aug. 16, 1932.   B. T. ANDREN   1,872,385
CONNECTING PARTS
Filed April 2, 1930
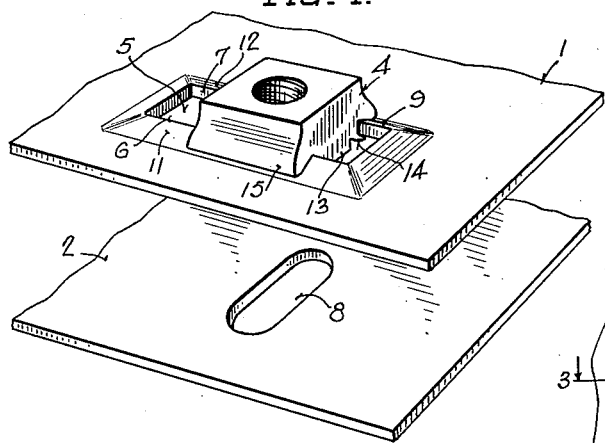
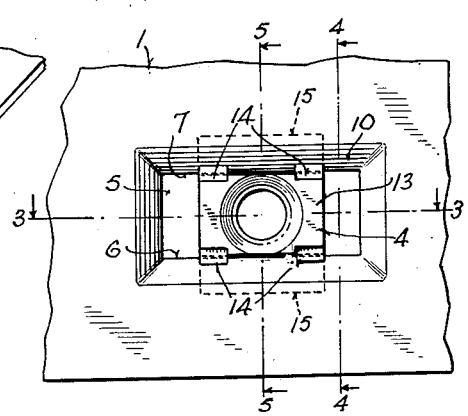
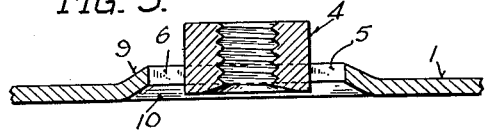
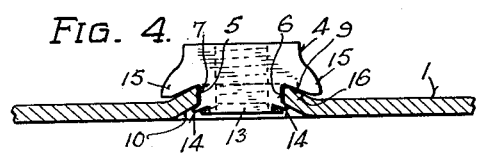
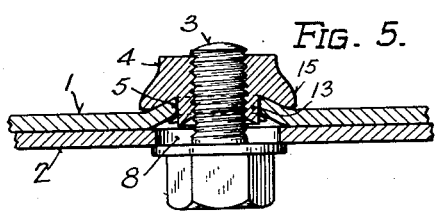
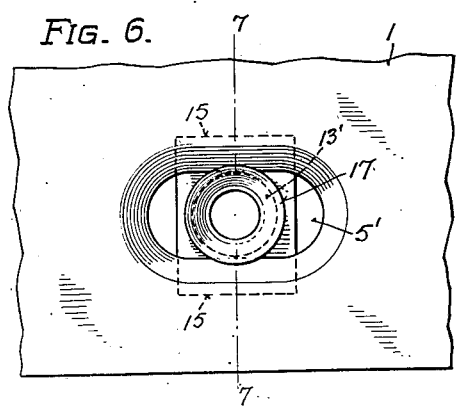
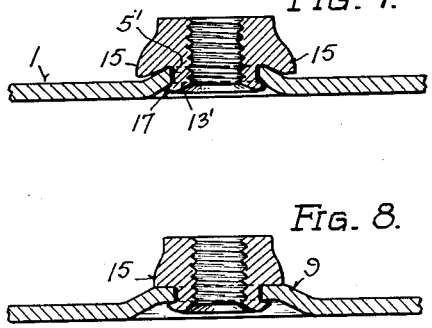
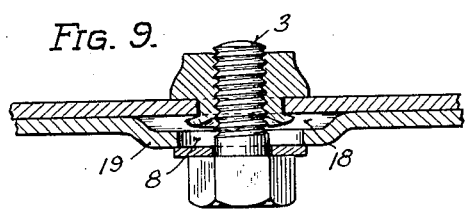
INVENTOR.
Birger T. Andren
BY
ATTORNEY.

Patented Aug. 16, 1932

1,872,385

UNITED STATES PATENT OFFICE

BIRGER T. ANDREN, OF MILWAUKEE, WISCONSIN, ASSIGNOR TO A. O. SMITH CORPORATION, OF MILWAUKEE, WISCONSIN, A CORPORATION OF NEW YORK

CONNECTING PARTS

Application filed April 2, 1930. Serial No. 441,056.

This invention relates to a manner of connecting a comparatively thin member to another member and resides in a manner of securing nuts in perforations formed in the comparatively thin member so that such nuts can be moved relative to the member to properly position the nut with respect to the bolt adapted to be attached thereto, and in such manner as to hold the nut against rotation when the bolt is being inserted to secure the members together.

The object of the invention is to attach a nut to a thin member in such manner as to more readily facilitate the proper positioning of the nut with respect to the threaded member to be secured thereto.

Other objects and advantages will be apparent from the following detailed description.

For a better understanding of the invention, reference is now made to the accompanying drawing in which the views are as follows:

Fig. 1 is a perspective view showing a nut connected to a metal plate positioned over a plate to be secured thereto.

Fig. 2 is a bottom view of the plate with the nut secured thereto.

Fig. 3 is a section on line 3—3 of Fig. 2.

Fig. 4 is a section taken on line 4—4 of Fig. 2.

Fig. 5 is a section on line 5—5 of Fig. 2 showing plates connected together.

Fig. 6 is a bottom view showing a modified form.

Fig. 7 is a section taken on line 7—7 of Fig. 6.

Fig. 8 is a section of another modified form.

Fig. 9 is a sectional view showing a modified connection of parts.

It is often desirable in bolting parts together, particularly in inaccessible places or other positions accessible only with difficulty, to provide some manner of holding the nut in desired position while the bolt is being applied thereto. Furthermore, it is often difficult, particularly in the final assembly of parts, to bring the holes into proper alignment for the insertion of the bolt therein.

The present invention makes it possible to readily bring the nut into alignment with the bolt or bolt hole so that the bolt may be rapidly applied thereto and furthermore provides a manner for supporting the nut against rotation when the bolt is inserted into the nut. In addition, the invention provides a construction whereby certain metal adjacent the bolt is placed under compression when the bolt is tightened in a manner such that the compression stresses will oppose stresses tending to loosen the parts during service.

In certain respects, the present invention relates to the invention set forth in my Patent No. 1,705,463, dated March 12, 1929.

In practice, the invention has been applied to the assembly of automobile parts but various other applications of the invention will be apparent from the following detail description.

Referring particularly to Figs. 1 to 5, inclusive, the numeral 1 designates a comparatively thin member or plate adapted to be connected to a second member 2 by means of a bolt 3 extending through aligned apertures in the respective members and engaging a nut 4.

The plate 1 is provided with a slot 5 having parallel longitudinal side walls 6 and 7. The member 2 preferably is provided with a similar slot 8 extending at right angles to the slot 5.

The metal adjacent the longitudinal side margins of the slot 5 is displaced to form embossments 9 upon one side of the plate and a recess 10 upon the opposite side.

The embossments 9 preferably have inclined upper surfaces 11 and 12 and may be made simultaneously with the formation of the slot 5.

The slot forms a guideway for the nut 4 which is slidably secured within the slot so that the nut may be readily aligned with respect to the bolt. To this end, the nut is provided with a projection 13 of reduced cross section adapted to extend through the slot and engage the opposite side walls thereof. The lower face of the projection 13 is disposed within the recess and slightly above the plane of the lower side of the plate 1 for a purpose later to be described. The projection 13 as shown in the above figures is of rectangular contour so as to hold the nut against rotation within the slot when the bolt is applied thereto. However, the projection 13 may be of any desired non-circular contour and accomplish the same purpose. The projection 13 is provided with oppositely extending ears 14 engaging the marginal walls of the slot to prevent removal of the nut from the plate.

Extending outwardly from opposite sides of the body of the nut 4 are shoulders 15 having inner inclined faces 16 adapted to ride upon the embossments 9. The degree of the inclination of the faces 16 is preferably slightly less than the inclination of the upper faces of the embossment as shown in Fig. 4 so that when the embossments are compressed during the tightening of the bolt the change in degree of inclination of the faces on the embossments will cause the shoulders 15 to firmly seat upon the same.

As indicated in Fig. 5, the part 2 is secured to the recessed side of the plate so that when the parts are drawn together by the tightening of the bolt 3 the material of the embossments will be placed under compression and the stresses set up by the compression will resist the tendency of the parts to loosen in service.

In making the connection as illustrated in Figs. 1 to 5, inclusive, it is preferable to form the embossments 9 in the plate at the time the slot 5 is made and before the nut 4 is applied thereto. The nut is formed with the projection 13 of such dimensions as to be readily inserted in the slot 5. After the nut is applied to the slot, a tool is applied to the end or face of the projection 13 to deform the same and provide the ears 14 which, together with the shoulders 15, provide a slot or guideway in which the walls 6 and 7 of the slot 5 in the plate 1 are positioned, allowing the nut to freely move longitudinally of the slot 5 and at the same time preventing removal of the nut. The plate 1 and part 2 are then placed side by side and a bolt 3 is passed through the perforation in the part 2, and the nut 4 is located to receive the bolt in threaded engagement therewith. The bolt is tightened until the embossments 9 are compressed and loosening of the bolt is thereby prevented.

The invention as above set forth eliminates the necessity of accurate positioning of the perforations in the members to be joined in order to obtain the required alignment and the bolt may be applied without injuring the threads thereof.

In the modification shown in Figs. 6 and 7, the nut is provided with a tubular projection 13′ extending through the guide slot 5′ and having the free end of the slot flared outwardly to form an annular lip 17 adapted to overlap the side margins of the slot within the recess 10. The nut in this instance is held against rotation by the engagement of the dished shoulders 15 of the nut with the embossments 9. In other respects, the modification is similar to that of the preferred form.

As shown in Fig. 8, the embossments 9 may have a substantially flat upper surface and the shoulders 15 may be of similar construction. In other details the construction is similar to that shown in Figs. 1 to 5 inclusive.

The modification as shown in Fig. 9 differs from the form shown in Fig. 8 in that the part 2 has the metal about the slot 8 displaced to form a recess 18 and embossments 19 instead of the plate 1 to which the nut is attached.

Although the invention has been described in connection with the securing of metal plates together as shown in the drawing, it is understood that the invention is not to be limited thereto and that various modifications and changes in the construction may be made within the scope of the accompanying claims without departing from the applicant's invention.

What is desired to be protected by Letters Patent is:

1. A method of connecting members which comprises providing the respective members to be connected with slots, attaching a nut to one of said members so that the nut is slidable in the slot thereof, arranging said members in juxtaposition with the slots thereof in angular relation to each other, and passing a threaded member through said slots and into engagement with said nut to secure said parts together.

2. A method of connecting members which comprises providing the respective members with slots, deforming the longitudinal marginal portions of the slot in one of said members to form a recess upon the face of the last named member, attaching a nut to one of said members so that the same is slidable in the slot thereof, arranging the members in juxtaposition with the recessed face of one of the members in engagement with the face of the other member and with the slots extending in an angular relation to each other, and passing a threaded member through the slots and into engagement with the nut.

3. A method of connecting members which comprises forming a slot in one of the members and a bolt-receiving hole in the other, attaching a nut to the slotted member so that the nut is slidable in the slot thereof, arranging the members in juxtaposition with the hole in one of the members in alignment with the slot in the other, and passing a bolt through the hole and slot and into engagement with the nut to secure the parts together.

4. A method of connecting metal plates which comprises forming a slot in one of said plates and a bolt-receiving hole in the other, displacing the metal adjacent the longitudinal marginal edge portions of the slot to form a recess in one side of the plate and an embossment upon the other, non-rotatably securing a nut to the slotted plate so that the nut is slidable in the slot thereof, arranging the plates in juxtaposition with the recessed face of the plate in engagement with the other of said plates and with the hole and slot in alignment, and passing a bolt through said hole and into engagement with the threaded nut to secure the parts together.

5. Connected parts having juxtaposed members with aligned slots extending in angular relation to each other, a nut attached to one of the parts and slidable in the slot thereof, and a bolt passing through the aligned slots and into engagement with the nut to secure the parts together.

6. Connected parts comprising juxtaposed members, one of said members having a slot therein, a nut slidably secured within the slotted member, and a threaded element extending from the other of said members and into threaded engagement with the nut to secure said members together.

7. Connected parts comprising juxtaposed members having aligned holes therein, one of said holes being in the form of a slot, a nut non-rotatably and slidably secured within the slotted member, and a bolt extending through the aligned holes and into engagement with the nut to secure the parts together.

8. Connected parts comprising juxtaposed members having aligned holes therein, one of said holes being in the form of a slot, the slotted member having opposite longitudinal marginal edge portions adjacent the slot offset to form a recess upon one face of the member and embossments upon the other face, a nut non-rotatably and slidably secured within the slotted member, and a bolt extending through said holes and into engagement with the nut to secure the members together.

9. Connected metal plates comprising juxtaposed plates having aligned holes therein, one of the holes being in the form of a slot, the slotted plate having the longitudinal marginal edge portions of the slot displaced to form a recess upon one face of the plate and embossments upon the other face, a nut having a non-circular portion of reduced cross section extending through the slot and slidably secured to the plate, and a bolt extending through the holes and into engagement with the nut.

10. A method of securing a nut to a comparatively thin member which comprises forming a slot in the member, applying a nut having a projection of reduced cross section to the member with said projection extending through the slot, and displacing the metal in said projection of reduced cross section to slidably secure the nut within the slot.

11. A method of securing a nut to a thin member which comprises forming a slot in said member, displacing the material adjacent the longitudinal edge portions of the slot to form embossments on one side of the member and a recess on the opposite side, applying a nut having a non-circular projection of reduced cross section to the embossed side of said member so that said projection extends through the slot and into said recess, and slidably securing the nut to said member.

12. A method of securing a nut to a member which comprises forming a slot in said member, displacing the material adjacent the longitudinal edge portions of the slot to form embossments having upwardly inclined faces on one side of the member and having a recess in the other, applying a nut having a projection of reduced cross section adapted to extend through the slot and into the recess and having dished shoulders adapted to engage the inclined face of the embossments, and expanding the material of the projection of reduced cross section into engagement with the walls of the recess to slidably and non-rotatably secure the nut to the member.

13. A nut comprising a body having a threaded opening therethrough, means integral therewith for providing guideways in two opposite sides of the nut to receive a slotted plate-like member and allow the nut to be freely moved longitudinally of the slot in said member, means for securing the nut to the slotted member, and means to prevent the nut from turning relative to the slotted member.

In witness whereof, I have hereunto subscribed my name at Milwaukee, Wisconsin, this 29th day of March, 1930.

BIRGER T. ANDREN.